J. F. SANFORD.
Lamp-Wick Trimmer.
No. 86,868.
Patented Feb. 9, 1869.
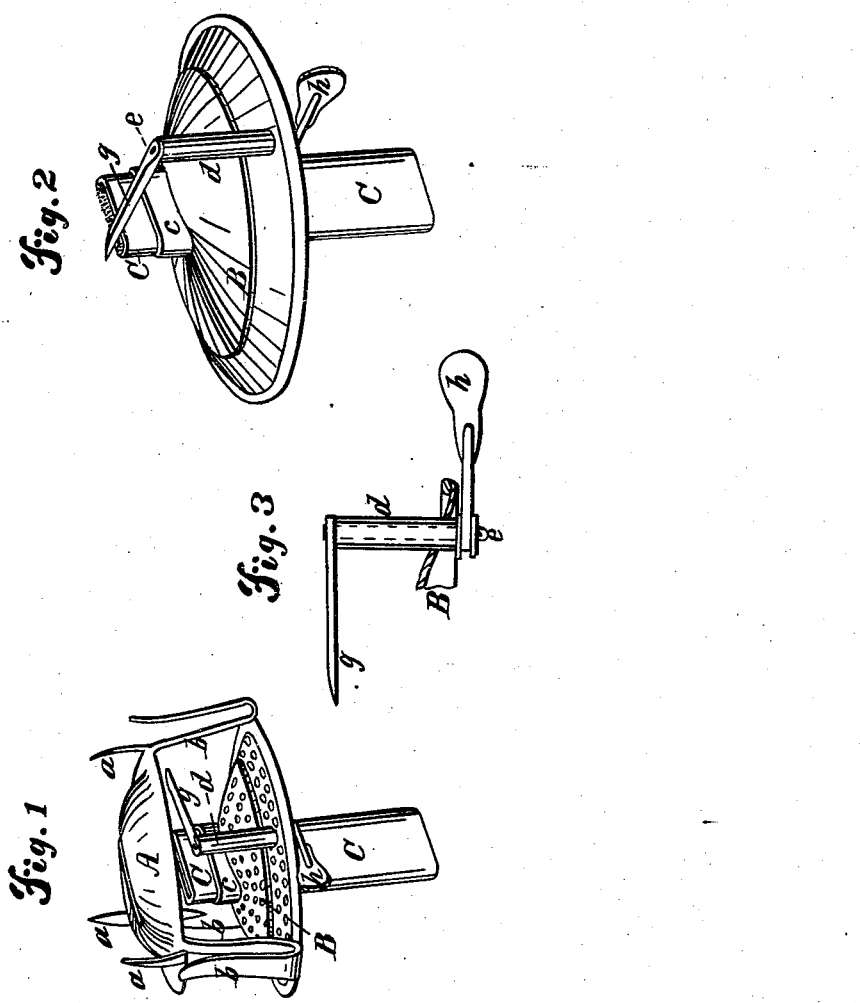

JOHN F. SANFORD, OF KEOKUK, IOWA.

Letters Patent No. 86,868, dated February 9, 1869.

IMPROVEMENT IN LAMP-WICK TRIMMERS.

The Schedule referred to in these Letters Patent and making part of the same.

*To all whom it may concern:*

Be it known that I, JOHN F. SANFORD, of Keokuk, in the county of Lee, and State of Iowa, have invented a new and improved Lamp-Wick Trimmer; and I do hereby declare that the following is a full, clear, and exact description thereof, reference being had to the accompanying drawings, making part of this specification, in which—

Figure 1 is a perspective view, showing my improved trimmer applied to one form of lamp-burner.

Figure 2 is a perspective view of the trimmer, with a portion of the burner removed, showing the blade of the trimmer in the act of trimming a wick.

Figure 3 shows more particularly the construction of the trimmer.

Similar letters of reference indicate corresponding parts in the several figures.

This invention relates to a new and improved device, which is applicable to lamp-burners of various kinds, having flat-wick tubes, and which is designed for removing the cinder, or snuff, from the wick-tubes, whether they be lighted or not.

The cinder, or snuff, which forms on the end of a lamp-wick may be readily removed, and the wick kept in good order, for giving an even flame, by first depressing the wick in its tube, so as to leave only its charred end exposed, and then drawing a knife-edge, or other suitable scraper, across the upper end of the wick-tube.

This mode of trimming a lamp-wick is preferable to the use of shears for this purpose, for the reason that the latter is a very nice operation, requiring great care and a steady hand to cut the wick even; besides, it is not necessary to cut a wick at all, as, by carefully removing the burnt cinder, the wick will supply oil freely to the flame.

The nature of my invention consists in a trimming-blade, or scraper, applied to a lamp-burner in such relation to the upper end of the wick-tube thereof that it can be conveniently used for removing the cinder, or snuff, from the wick, whether the latter be lighted or not, as will be hereinafter explained.

To enable others skilled in the art to understand my invention, I will describe its construction and operation.

In the accompanying drawings, I have represented my invention applied to a lamp-burner, which has its cone, A, supported upon a perforated circular base, B, by means of chimney-supporting stirrup b; but I do not confine myself to this style of lamp-burner, as my improved trimmer is applicable to other styles of burners; nor do I claim, under this petition, the style of burner shown in fig. 1 of the drawings, as I shall make this the subject of a separate application for a patent, marked case B.

The flanged cone A is constructed with a flame-opening through it, of any suitable shape, and also with depending stirrups, b, which latter may be formed on the edge of the flange of the cone; or they may be made of separate pieces of metal, and secured to the flange of the cone by soldering, or in any suitable manner.

The upturned lips a serve as inside bearings for the chimney, and the upturned portions of the stirrups b serve as outside bearings for the chimney.

The base, B, which may be made of sheet-metal, perforated, or of wire gauze, applied to a strengthening-ring, is soldered or otherwise secured to the lower extremities of the stirrups b, and provided with a short tube, c, passed centrally through it, and secured permanently to it.

This tube c is of sufficient size internally to receive through it the wick-tube C, upon which a rib, or stop, is formed, to support the burner by the lower end of its short tube, c, resting upon said rib.

The chimney, which has a cylindrical base, is received and supported by the stirrups b, and encloses all that portion of the burner above the perforated base, B.

Through the base, B, at a suitable point near its circumference, a hole is made, through which a tube, d, is passed, and permanently soldered, or otherwise affixed, to said base.

Through this tube a pin, e, is passed, having a trimming-blade, g, secured to it, in such manner and relation to the wick-tube C that, by turning this pin e about its axis, the said blade can be made to sweep across the upper end of the wick-tube, in close contact therewith.

To the lower end of the said pin e, beneath the base-plate B of the burner, a short finger-piece, or handle, h, is secured in a suitable manner, so that its free end extends beyond the edge of the base, B, to allow the blade g to be vibrated or moved across the upper end of the wick-tube, when the chimney is in its place.

The trimming-blade g may be curved and bevelled, as shown in fig. 2, so as to present two scraping-edges to the wick; or, if desirable, a flat blade, with parallel edges, may be adjusted upon the upper end of the pin e, so as to present but one scraping-edge to the upper end of the wick-tube.

I prefer to make the tubular bearing d long enough to have its upper end in, or nearly in, the horizontal plane of the upper end of the wick-tube.

It will be seen, from the above description, that the blade g can be readily turned out of the way when it is not in immediate use, and that the cinder, or snuff, upon the upper end of a wick in tube C can be readily removed, whether the wick be lighted or not, and also without removing the chimney from its place on the burner, by simply vibrating the exposed finger-piece h, which will cause the blade g to sweep back and forth across the upper end of the wick-tube.

I am aware that trimmers for lamp-wicks which operate without removing the chimneys are not new; but those heretofore contrived have proved so objectionable that they have not been practically useful. and for two principal reasons.

In the first place, they have presented shaving-edges to the work to be done. This prevents them from accommodating themselves, with the desired accuracy, to the object to be accomplished. This accuracy is much more completely attained by the use of scraping-edges, as shown in my arrangement.

And secondly, all the points on these shaving-edges are made to revolve in vertical arcs of circles around a horizontal shaft, by which means they have the upper edge of the wick in a corresponding shape, either in its cross-section, or in its longitudinal section, according as this horizontal axis of revolution is parallel or perpendicular to the plane of the flat-wick tube; whereas, by my contrivance, the upper edge of the wick is left both straight and flat, and is much more effectually freed from cinders than is possible under the other arrangement.

Disclaiming, therefore, these defective contrivances,

What I claim as new, and desire to secure by Letters Patent, is—

A trimming-blade that moves, with a scraping-edge, horizontally across the upper end of the wick of a lamp, in such a way that its edge shall be supported by, or be in contact with, or, at least, shall move parallel to the upper extremity of the parallel sides of the wick-tube, substantially as above described.

JOHN F. SANFORD.

Witnesses:
R. P. LOWE,
E. S. HUBBARD.